May 7, 1957 R. LAMBERT 2,791,686
RADIO NOISE CONTROL DEVICES
Filed July 26, 1952 10 Sheets-Sheet 1
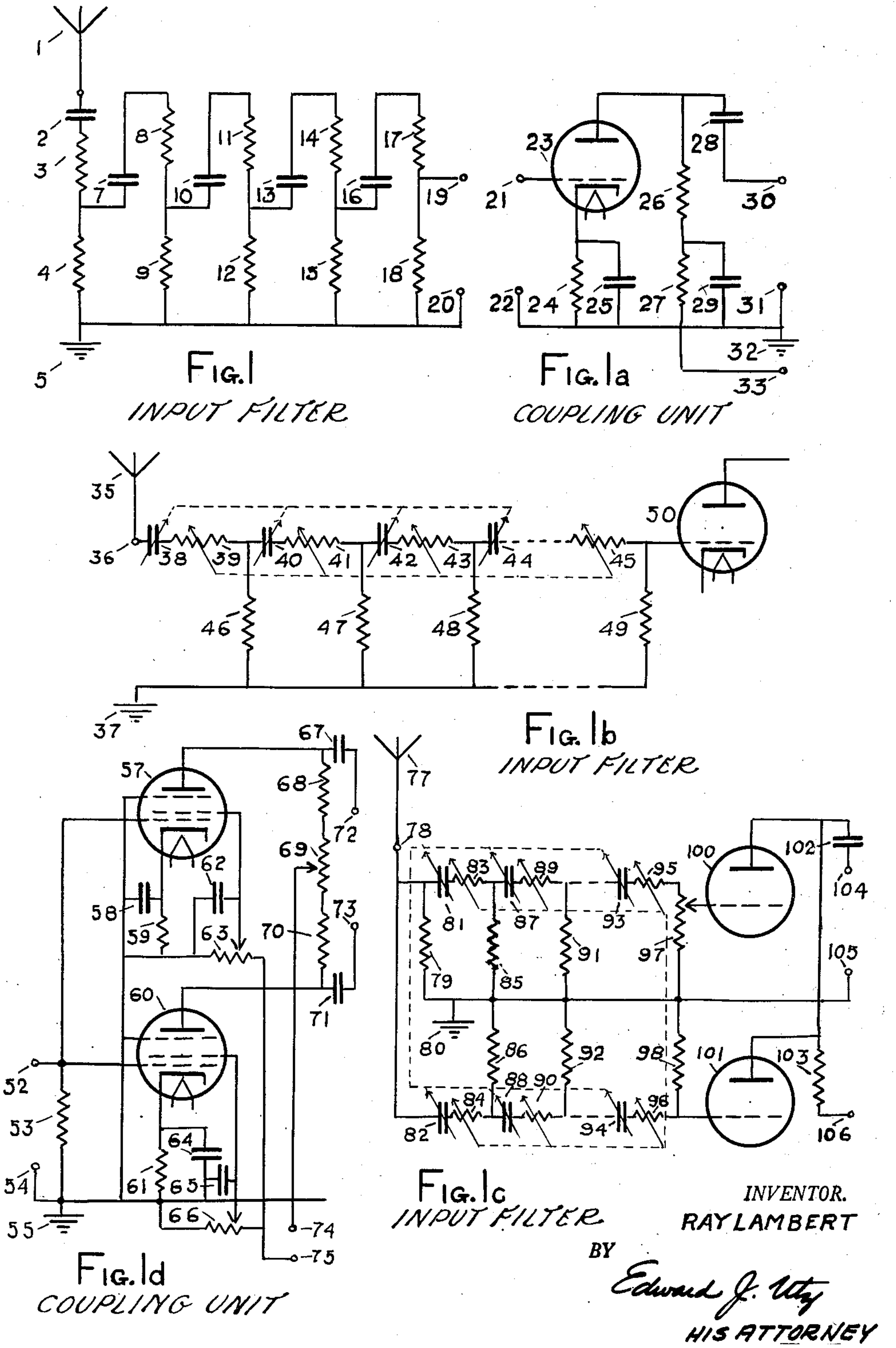
FIG. 1 INPUT FILTER, FIG. 1a COUPLING UNIT, FIG. 1b INPUT FILTER, FIG. 1c INPUT FILTER, FIG. 1d COUPLING UNIT
INVENTOR.
RAY LAMBERT
BY Edward J. Utz
HIS ATTORNEY

INPUT FILTER

INPUT FILTER

INPUT FILTER

INVENTOR.
RAY LAMBERT
BY Edward J. Utz
HIS ATTORNEY

May 7, 1957 R. LAMBERT 2,791,686
RADIO NOISE CONTROL DEVICES
Filed July 26, 1952 10 Sheets-Sheet 3
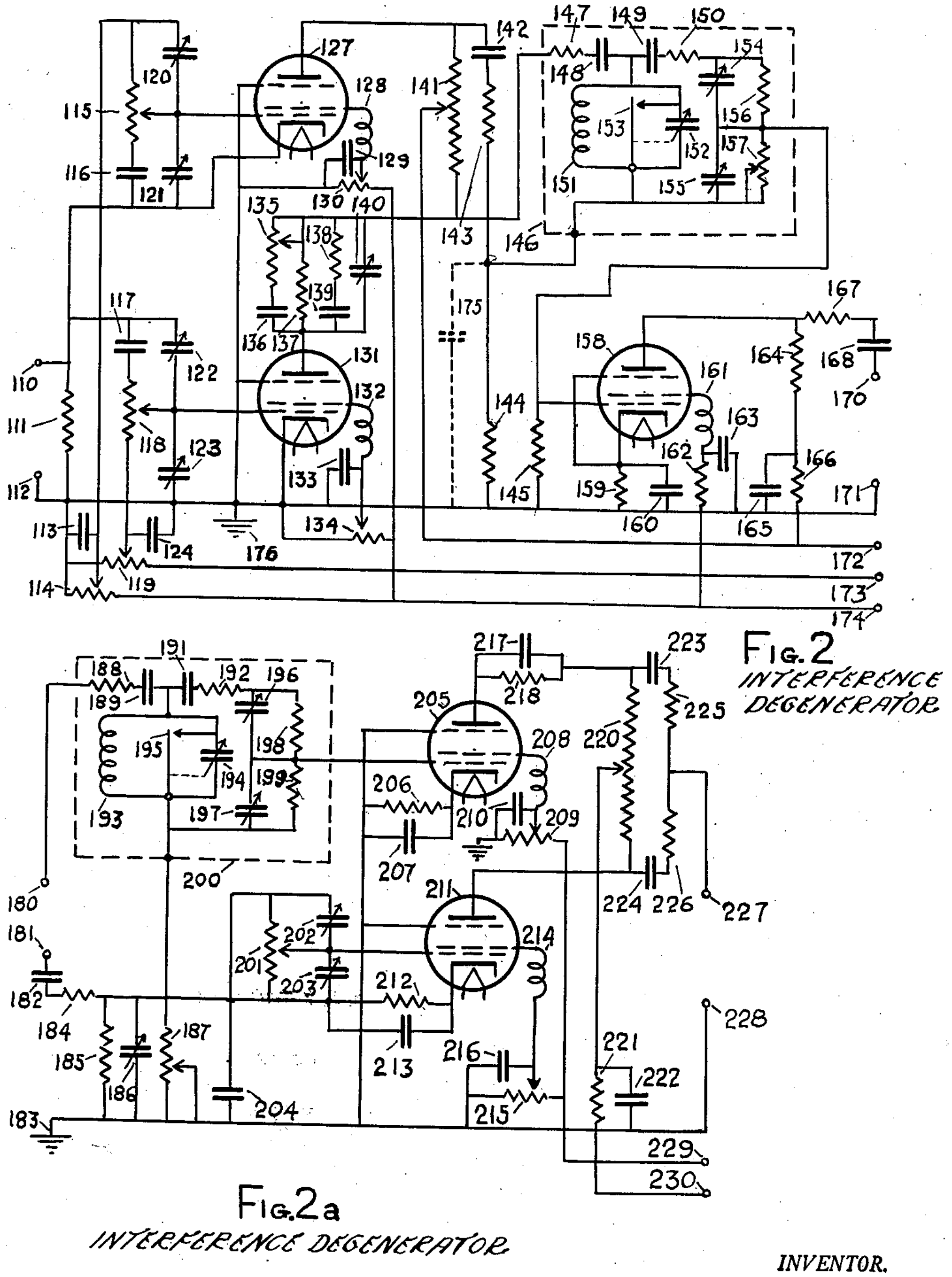
FIG. 2 INTERFERENCE DEGENERATOR, FIG. 2a INTERFERENCE DEGENERATOR
INVENTOR.
RAY LAMBERT
BY Edward J. Utz
HIS ATTORNEY

INTERFERENCE DEGENERATOR

INVENTOR.
RAY LAMBERT
BY Edward J. Utz
HIS ATTORNEY

INTERFERENCE DEGENERATOR

INTERFERENCE DEGENERATOR

AERIAL

INVENTOR.
RAY LAMBERT
BY Edward J. Utz
HIS ATTORNEY

May 7, 1957 R. LAMBERT 2,791,686

RADIO NOISE CONTROL DEVICES

Filed July 26, 1952 10 Sheets-Sheet 6

FREQUENCY CONVERTER

INVENTOR.
RAY LAMBERT
BY Edward J. Utz
HIS ATTORNEY

AUTOMATIC VOLUME CONTROL

INVENTOR.
RAY LAMBERT
BY Edward J. Utz
HIS ATTORNEY

INVENTOR.
RAY LAMBERT
BY Edward J. Utz
HIS ATTORNEY

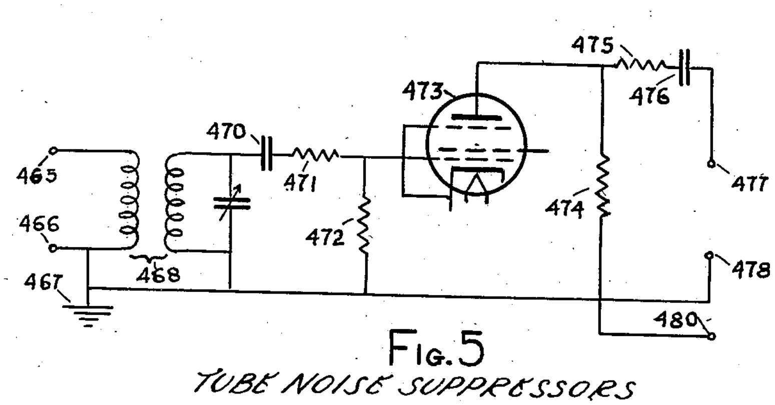
FIG. 5
TUBE NOISE SUPPRESSORS
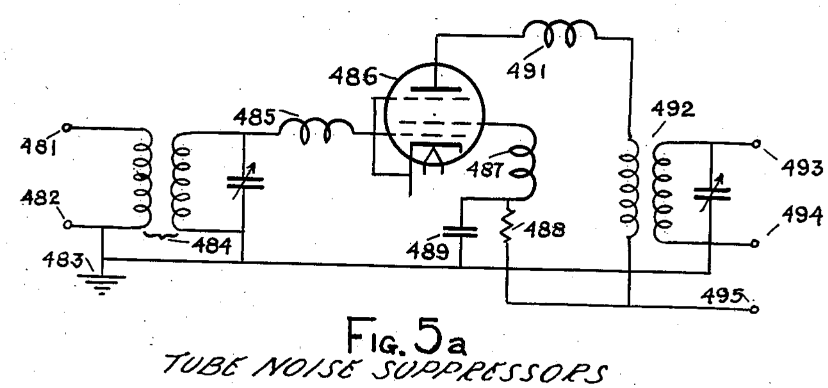
FIG. 5a
TUBE NOISE SUPPRESSORS
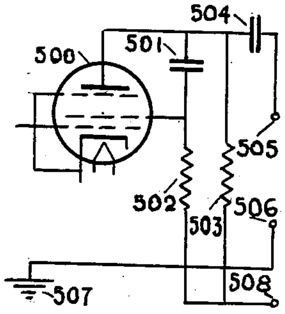
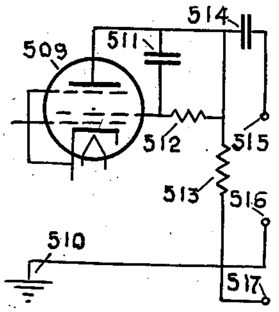
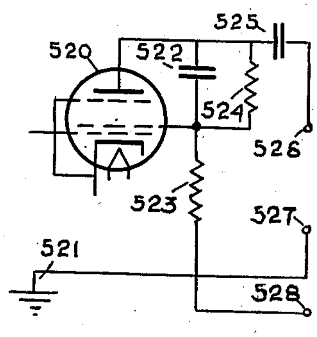
FIG. 5b FIG. 5c FIG. 5d
NOISE SUPPRESSOR NOISE SUPPRESSOR NOISE SUPPRESSOR
INVENTOR.
RAY LAMBERT
BY Edward J. Utz
HIS ATTORNEY May 7, 1957 R. LAMBERT 2,791,686

RADIO NOISE CONTROL DEVICES

Filed July 26, 1952 10 Sheets-Sheet 10

NOISE SUPPRESSOR

NOISE SUPPRESSOR

INVENTOR.
RAY LAMBERT
BY Edward J. Utz
HIS ATTORNEY

United States Patent Office 2,791,686

Patented May 7, 1957

2,791,686

RADIO NOISE CONTROL DEVICES

Ray Lambert, Cincinnati, Ohio

Application July 26, 1952, Serial No. 301,055

20 Claims. (Cl. 250—20)

My invention relates to radio noise control and more particularly pertains to the elimination of certain electrical impulses causing noise and entering the receiving system through the aerial or originating in the receiver circuit due to thermionic and electronic irregularities in tube and other circuit elements.

The effects of relatively sudden variations in the electrical potential gradient of the atmosphere and random electromagnetic radiations produce the effects known as static or atmospherics in voltage amplitude modulated radio receivers. These noise impulses are encountered not only in the common broadcast band but in bands above and below, including high frequency and television service. Added to these natural disturbances are many arising from artificial causes and affecting reception through the aerial. In addition to these natural and artificial sources of interference which enter the system through the aerial are voltage irregularities giving rise to noise within the receiving apparatus. Examples are tube noises and thermal noises in resistors. The problem is to eliminate the effects of these two chief sources of noise—electrical impulses entering through the aerial and electrical impulses originating in the receiver circuit itself.

Noise (electrical impulses resulting in noise) that enters the receiver at other points than the aerial may be excluded by well known means of circuit shielding and power line filtering. Noises of nearby origin that enter the receiver through the aerial in some cases may be suppressed through separate pick-up and noise-signal opposition. Means of noise suppression mentioned in this paragraph are not included in this disclosure.

Noise effects may be caused by the impulse excitation of tuned circuits and other circuits capable of oscillating under electrical shock or impulse. Very sudden or instantaneous impulses produce equal voltage amplitude in all simple tuned circuits. The response differs in the duration of the ensuing wave train in the tuned circuit as a function of the circuit Q or decrement and as a function of the natural frequency of the tuned circuit. The effects of noise impulses having a longer time of voltage rise (lower $dE/dt$) differ between circuits of different frequency having, in general, a greater effect the lower the frequency of the tuned circuit.

The form of the response in terms of the voltages developed in a tuned circuit by a sharp or instantaneous impulse is expressed by the formula $$E = Ve^{-rt/2L} \cos \omega t$$

and the response of a tuned circuit under the impact of a voltage variation the duration of which is much greater than the period of the tuned circuit is given by the relation, $$E = (V/RC)\left[\frac{2Le^{-t/RC}}{r^2+4L^2\omega^2} + e^{-rt/2L} \cos\left(\omega t - \cos^{-1}\frac{-r}{\sqrt{r^2+4L^2\omega^2}}\right)\right]$$

In the above expressions V is the voltage of the impulse having a time constant RC, and $r$, L, and $\omega$ represent resistance, inductance and angular velocity in the tuned circuit.

Atmospheric or static impulses have a time constant much greater than the period of oscillation of a tuned circuit in the broadcast band while tube noise impulses are much sharper, approaching the instantaneous. This difference calls for a different approach in the two cases.

The noise effects discussed above may be studied and measured without the presence of a radio frequency signal in the system. A greater cause of noise in radio reception is the modulation of the carrier in the radio frequency amplifier and frequency conversion tubes by the noise impulses. This is due simply to the fact that in most cases these tubes offer different transconductance values with different grid potentials. Hence, a static impulse or a tube noise impulse in changing momentarily the grid voltage changes momentarily the amplification of the signal, causing modulation. After the carrier is modulated in such a manner the noise cannot be removed subsequently in the radio receiver circuit. At this point the noise impulses become a part of the audio signal and cannot be removed any more than an element of speech or music.

The operation of the radio frequency tubes on the straight portion of the grid-voltage plate-current ($E_g$—$I_p$) curve is essential for the purpose of noise suppression whether the noise impulses enter through the aerial or arise in the circuit through uneven electron emission.

Atmospheric noises, as such, ordinarily do not affect audio frequency amplification directly. Tube noises and thermal noises do, however, impair the response in the audio stages.

The principal object of my invention is to eliminate atmospheric and circuit noises.

Another object of my invention is to provide for the operation of amplifier tubes on the straight portion of the grid-voltage plate-current ($E_g$—$I_p$) characteristic or over a range affording constant transconductance. Due to the influence on associated input impedance values and phase relatitons, the grid swing of the amplifier tubes should be restricted not only to the linear portion of the grid-voltage plate-current ($E_g$—$I_p$) characteristic but also should be kept below the voltage at which grid current begins to flow.

Another object of my invention is to provide means for effective filtering of long voltage swings on the input of the first tube.

Another object of my invention is to provide an automatic volume control system which does not alter the linear operation of the tubes.

Another object of my invention is to provide for frequency conversion (in superheterodyne circuits) that avoids asymmetrical operation of the mixer and amplifier tube elements in the converter.

Another object is to provide for the diversion of the total signal into two branches, inversion and cancellation of noise impulses entering through the aerial, in the presence of a desired radio frequency signal. An essential requirement of this operation is that no tuned circuit may be used in the line of cascade amplification preceding this operation.

Another object is to provide for the cancellation of tube and circuit noises. In this system, circuit noises such as the thermal noise in grid resistors, are not treated separately but only in conjunction with tube noises with which they are associated. Such tube and circuit noises may not be treated as a single unit in the radio receiver because they do not enter the system at any one place or from one cause—they are everywhere. These tube noise impulses and certain elements of the thermal noise impulses are thought to be very sharp, approximating instantaneous impulses. These cause impulse excitation of a tuned circuit in the plate of the tube and, to a smaller extent, in a tuned circuit in the grid of the tube. To a still smaller degree the screen grid partition current causes noise by its sudden effect on the value of the plate current.

The basic principle underlying the control of tube and circuit noise excitation of associated tuned circuits as described herein consists in changing the energy of these impulses to a form that may be dissipated without damage to the received signal. In the radio frequency stages the energy of the tube noise impulses may be stored as electrostatic energy and dissipated gradually or stored as magnetic energy and discharged gradually.

In general, my invention comprises an input filter utilizing resistances and condensers only, excluding inductive reactances to avoid impulse excitation. A special phase rotating design is employed, utilizing as each high-pass member a resistance in series with a condenser. I employ a linear interference degenerator which operates on the basic principle of a bridge circuit to which is added means of inverting the signal voltage from one corner of the bridge and causing it to cancel the signal from the opposite corner. To prevent cancellation of the radio signal a phase rotating and filtering device, consisting of a tuned circuit, is inserted in series with one bridge arm.

Frequency conversion relatively free from noise is provided by separating the functions of local oscillation, mixing, and rectification (detection) and providing for linear operation of the mixer tube as an amplifier.

In my invention automatic volume control permitting linear operation of the radio frequency amplifier tubes operates upon circuit impedances external to the amplifying tubes and does not interfere with the linear operation of the tubes.

Noises arising from the operation of the amplifier tubes and associated resistances may be reduced thirty decibels or more by the storage of the energy of the noise impulses at or near their sources and by dissipating this energy in a harmless manner. This operation may take the form of capacitive storage with appropriate time constant (RC) or by magnetic storage in radio frequency circuits.

In audio circuits a process of filtering and conversion of the energy of the thermionic tube noise impulses to a current of a frequency outside the audio spectrum is employed. The energy of these impulses is then dissipated in a harmless manner.

In the schematic drawings:

Fig. 1 is a representation of the input filter;

Fig. 1*a* is a coupling unit;

Fig. 1*b* is a modification of the diagram of Fig. 1;

Fig. 1*c* is a modified form of the diagram of Fig. 1*b*;

Fig. 1*d* is a modified form of coupling unit;

Figs. 1*e*, 1*f*, and 1*g* are modifications of Fig. 1;

Fig. 2 represents the linear interference degenerator;

Fig. 2*a* is a modification of the diagram of Fig. 2;

Fig. 2*b* is another modification of the diagram of Fig. 2;

Fig. 2*c* is a representation of an aerial;

Fig. 2*d* is another modification of the diagram shown in Fig. 2;

Fig. 2*e* shows a modification of the diagram of Fig. 2*b*;

Figs. 2*f* and 2*g* show modifications of 2*d*;

Figure 4:
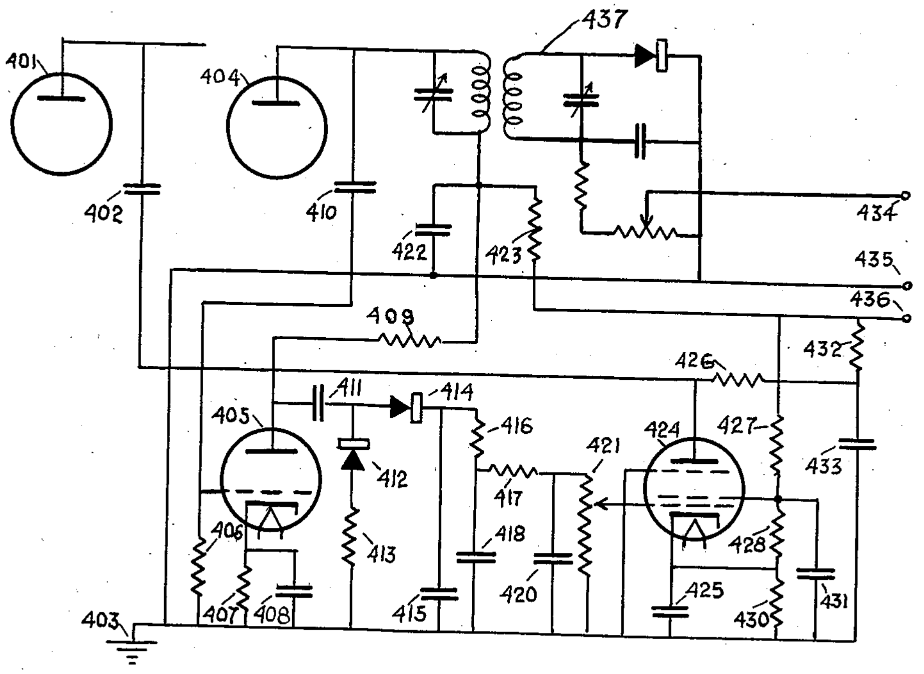
Fig. 4 is a representation of the automatic volume control.
Figure 4B:
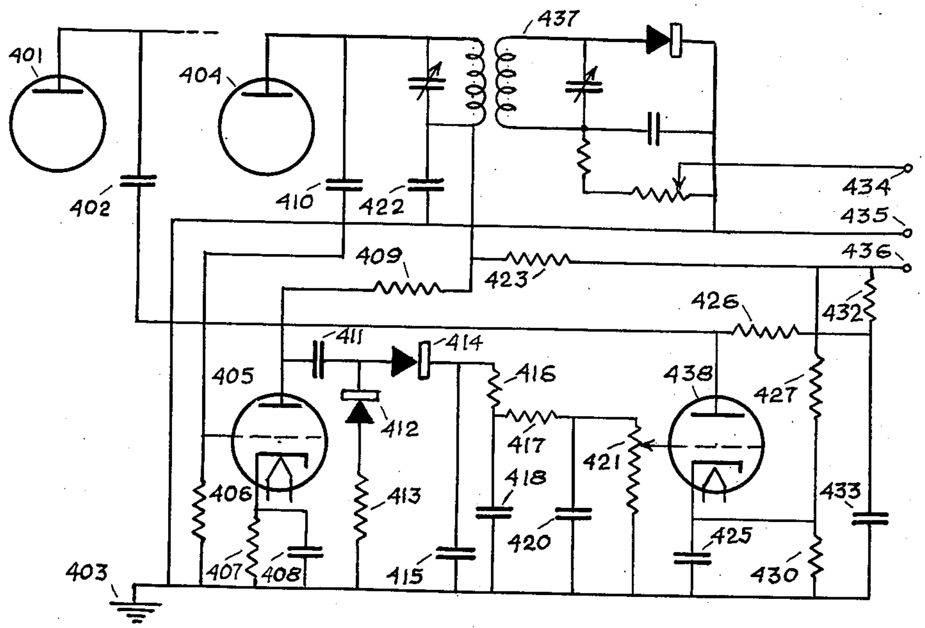
Figure 4B:
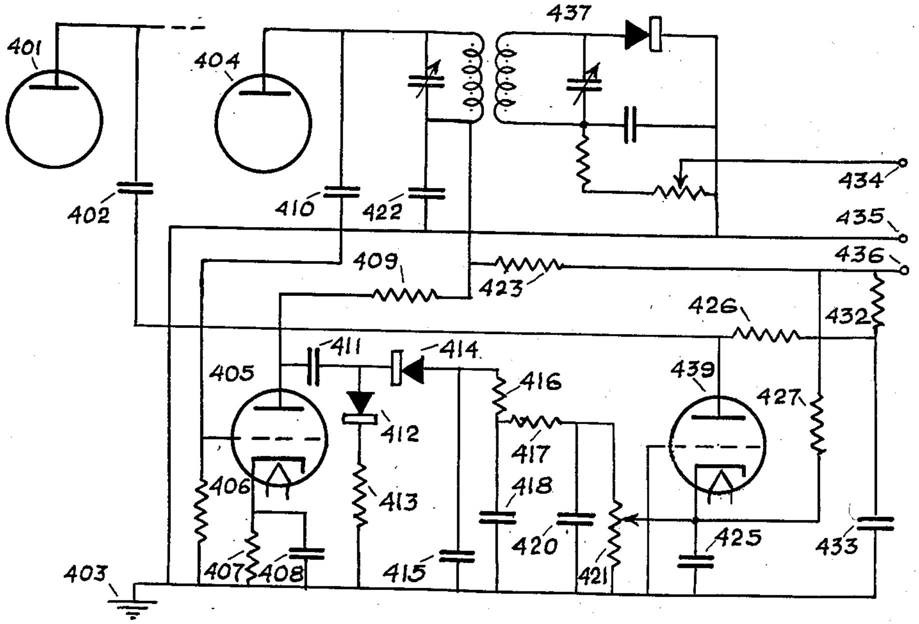
Figure 5E:
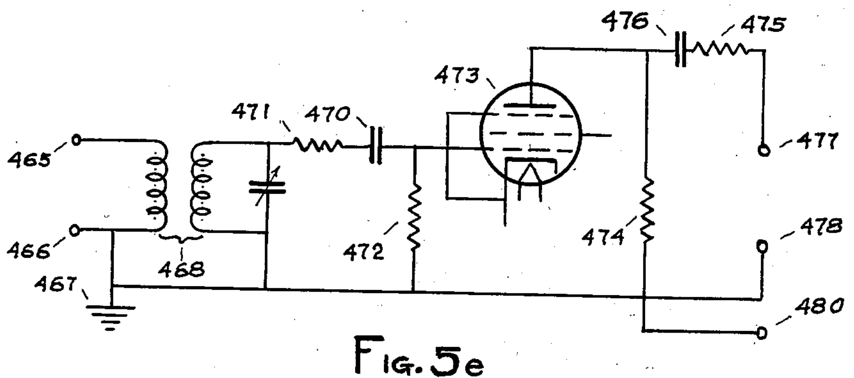
Figure 5F:
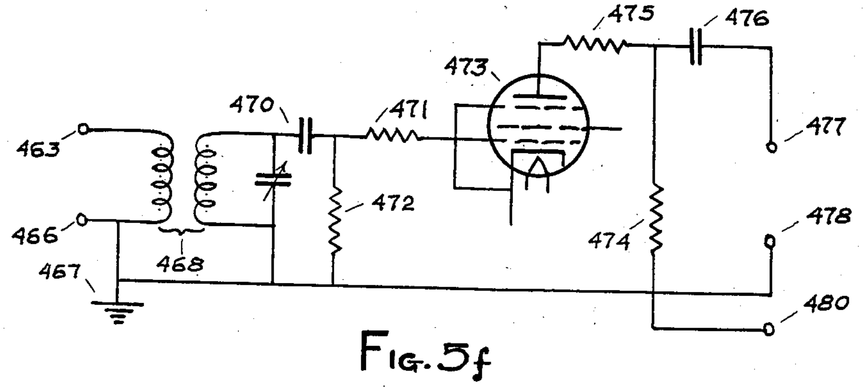

Figs. 4*a* and 4*b* are modifications of Fig. 4;

Figs. 5 and 5*a* illustrate tube noise suppressors;

Figs. 5*b*, 5*c* and 5*d* illustrate methods of suppressing screen-grid partition current noise;

Figs. 5*e* and 5*f* are modifications of Fig. 5.

Throughout this description it will be assumed that the amplifier tubes are operated linearly, with grid swing confined to the linear portion of the grid-voltage plate-current ($E_g$—$I_p$) characteristic and that the most positive grid swing does not draw grid current.

*Input filter*

Long voltage swings on the grid of the first tube are prevented effectively by the RC echelon filter shown in Fig. 1. This filter uses resistances and condensers only, chokes or inductances being omitted because of their undesirable tendency to oscillate when subjected to electrical impulses. This filter is a high pass filter using as the horizontal member in each section a condenser and resistance in series, each section being by-passed to ground through a resistance.

Referring to the drawings, in Figure 1, I provide an aerial 1, connected to condenser 2 and in turn connected to resistance 3. I show in series similar condenser and resistance units 7, 8, 10, 11, 13, 14, 16 and 17. It is not intended that the number of units illustrated in the drawing shall be conclusive but any one or more of said units may be employed depending upon signal strength and noise level. These condenser and resistance units are designed to pass the frequency of the desired band. The grounding members are the resistances 4, 9, 12, 15 and 18. These are designed to pass to ground the frequencies below the desired band.

In addition to its action as a high pass filter, without the use of chokes or inductances, the special feature of this design is the provision for differential phase rotation of dissimilar frequencies (sinusoidal signals) and the differential time displacement of non-sinusoidal impulses relative to voltage-time gradient ($de/dt$). For a high frequency the phase displacement between condenser 7 and resistance 8, for example, will be relatively slight, while for a lower frequency the phase displacement or rotation will be relatively greater. The amount of rotation is basically related to the expression, $\cot^{-1} 2\pi fCR$. Similarly, for impulses of differing steepness or voltage-time gradient, the impulses with steep gradients, or the portions of impulses with steep gradients, will slide ahead of those with more gentle gradients. At the same time, greater attenuation will be presented to impulses of gentle gradient. This has the effect of placing the sharp peaks in the valleys as well as lowering the hills on which the sharp peaks are located. Thus, a lowering and levelling of the interference spectrum is accomplished, reducing the grid voltage swing of the first or input tube.

The values of the condensers 2, 7, 10, 13 and 16 and the values of the resistances 3, 8, 11, 14 and 17 should be selected with reference to the band in which operation is desired.

These condensers and resistances may be made variable, with the condensers ganged together and the resistances ganged together, or both condenser chain and resistance chain ganged together to produce a common effect on the amount of angular rotation. This will allow control over the phase rotation as well as the attenuation imposed by the filter. The resistances should be selected with reference to their freedom from shunt capacity.

Care should be taken to minimize the stray capacity shunts across the resistances by mounting away from the ground or grounded objects as far as possible.

For maximum high pass, capacity to ground should be avoided between condensers 2, 7, 10, 13 and 16 and ground and between resistances 3, 8, 11, 14 and 17 and ground 5.

The tube 23 in Fig. 1*a* and its associated output load serves the purpose of coupling between the filter group, Fig. 1, and the input to the next unit of the receiver circuit and noise control system, shown in Fig. 2. It raises the signal level to compensate for the attenuation imposed by the RC echelon filter, Fig. 1 and, in some cases, may accommodate a greater peak to peak signal voltage.

The tube 23 is connected to the following circuit through the condenser 28, and plate coupling load 26. A conventional bias arrangement for tube 23 is illustrated, using resistance 24 and condenser 25. Resistance 27 and condenser 29 may be employed as a decoupling filter.

Lead 33 is connected to the plate voltage supply. A suitable ground 32 is provided. The output terminals 19 and 20 of the input filter are connected to terminals 21 and 22 of the coupling unit shown in Fig. 1a and its output terminals 30 and 31 are connected to terminals 110 and 112 (Fig. 2) of the linear interference degenerator.

*Linear interference degenerator*

Inversion and cancellation of atmospheric noise is accomplished by splitting the noise impulse signal and opposing the signal in the two branches for cancellation. In one of these branches the incoming (desired) sinusoidal radio signal is subjected to filtering and phase rotation (optimum, 180) which causes the unfiltered portion of the desired signal to unite in phase with the radio signal from the other branch. It is of fundamental importance to avoid the impression of the noise impulse upon cascade tuned circuit elements before inversion and cancellation.

Fig. 2 shows a circuit by which these operations may be accomplished. The signal entering at 110 and 112 is impressed across resistance 111. The signal voltage impressed across resistance 111 is divided and inverted in one branch, by tube 131. This signal is applied simultaneously to the grid of tube 131 and the cathode of tube 127. With circuit components properly adjusted and with switch 153 closed, there will be voltage equality and phase opposition impressed across the common plate load resistance 144. This causes cancellation of all signals, both atmospheric and desired program, across the output load resistance 144. With switch 153 open and the parallel tuned circuit (coil 151 and condenser 152) tuned to or near resonance with the desired signal, there will be a phase change across 151, causing the unfiltered portion of the desired signal in this branch of the tuned signal to unit in phase with that from tube 127. This output is impressed across resistance 145 which is the grid resistance of the coupling and amplifying tube, 158. The shield 146, connected to the top of the load 144 prevents capacity to ground from changing as the tuning of condenser 152 is varied.

In order to provide perfect inversion and cancellation there must be no transfer of signal energy across tube 127 through its cathode-anode capacity. To neutralize this effect the grid of tube 127 is grounded through a resistance, potentiometer 115. With the proper relation between the signal voltage impressed upon the grid by capacity coupling with the cathode and the signal voltage impressed upon the plate by the cathode-plate capacity, and with the proper adjustment of potentiometer 115 and condensers 120 and 121, the capacity signal transfer through the tube 127 will be cancelled. Since the phase relations of the input to tube 131 must correspond and also in order to equalize the signal voltage at the output, the mesh consisting of potentiometer 118 and condensers 122 and 123 is provided.

Any of the well known methods of securing the desired bias potentials between the grid and cathode of the tubes may be used. In Fig. 2 the condensers 116 and 117 are of relatively large values and serve to isolate direct voltages. The screen voltage supply of these tubes is conventional.

The plate circuit of tube 131 should be equalized with that of tube 127, which contains the mesh including the resistance 111 with the associated input apparatus (26, 28 and the plate impedance to tube 23 in Fig. 1a), 115 shunted by 120 and 121, 118 shunted by 122 and 123, together with associated distributed capacity. In order to introduce this equalizing factor in the plate circuit of tube 131, the mesh consisting of resistances 135, 137 and 138 and condensers 136, 139 and 140 is provided in the plate circuit of tube 131. It is important that equality of phase relations be maintained between indicated groups of impedances or meshes regardless of frequency. Resistance 135 is to match the plate resistance of tube 23 (Fig. 1a shunted by resistance 26). Resistance 137 equals 111, while 138 equals the parallel combination of 115 and 118 and the condenser 139 equals the parallel combination of 116 and 117. The variable or adjustable condenser 140 is used to compensate for distributed capacity in the input mesh.

The common signal load is resistance 144 in Fig. 2. These tubes 127 and 131 should be selected for approximate similarity of operation. The voltages of the plates of tubes 127 and 131 are equalized by adjusting screen potentiometers 130 and 134, shunted from variable arms to ground by by-pass condensers 129 and 133 respectively and the grid bias controls 114 and 119 shunted from variable arms to ground by condensers 113 and 124 respectively. The plate resistors consist of the two sections of potentiometer 141 providing an additional means of equalizing the tube circuits.

The phaser consisting of the inductance 151 and condenser 152 is set in oscillation by impulse excitation due to atmospherics passed by tube 131. If the output of the linear interference degenerator were taken directly at the top of resistance 144 some atmospheric interference would be experienced due to capacity coupling to ground from the plate circuit of 131 or the top of the phaser. To compensate for this phaser current through resistance 144, the mesh including condensers 154 and 155 and resistances 156 and 157 is provided. This is a facsimile of the stray coupling to ground just described in which resistance 156 is to resistance 157 as the plate resistance of tube 131 is to the coupling resistance 144, and in which the associated shunting capacities 154, 155, the plate capacity of tube 131 and 175 bear a corresponding reciprocal relation. In this manner the stray phaser voltage across 144 is cancelled by the phaser voltage across 157.

With this cancellation of the stray phaser signal, the chief action of the phaser is that of a filter, when the phaser is tuned to resonance with the desired signal.

Circuit branches shown as resistances 144 and 157 may be made inductive or may be portions of a common reactive or tuned circuit with adequate provision for correct phase and voltage relations, or each of these resistances may be shunted by an inductance.

The tube 158 together with its associated impedance meshes comprising grid resistance 145 and the cathode resistance 159 and shunting condenser 160 and the screen resistance 162 and its shunting condenser 163, plate load resistance 164, and filter consisting of its resistance 166 and condenser 165 serves as a coupling medium between the output of the linear interference degenerator proper and the first stage of conventional radio voltage amplification. The output of tube 158 is connected to terminal 170 through resistance 167 and condenser 168. The coupling medium is connected to the input tuned circuit of a conventional radio receiver at terminals 170 and 171. A terminal 173 is provided for negative bias voltage. Terminals 172 and 174 connect to plate supply voltages. A ground is provided at 176. The plate circuit of this tube 158 may contain the customary reactive elements. The coils 128, 132 and 161 absorb the impulses of the screen partition current and the condenser-resistance combinations 142 and 143, and 147 and 148, serve to suppress tube noises from the plates of tubes 127 and 131. The condenser-resistance combination 149 and 150 matches the effect of condenser-resistance combination 147 and 148.

*Noiseless frequency conversion*

In the conventional process of frequency conversion in the superheterodyne receiver a number of operations are performed by a single tube: amplification and transmission of the signal, local oscillation, mixing of the local signal (heterodyning) with the incoming signal, and rectification (detection). The requirement of linear tube operation as an essential condition for noise free operation is violated to the extreme in the conventional frequency converter. Due to the relatively high voltage values of the local oscillator impressed on the amplifier section incident to rectification the operation is extremely asymmetrical. This may be remedied by separating the functions of amplification and mixing, oscillation, and rectification.

Figure 3:
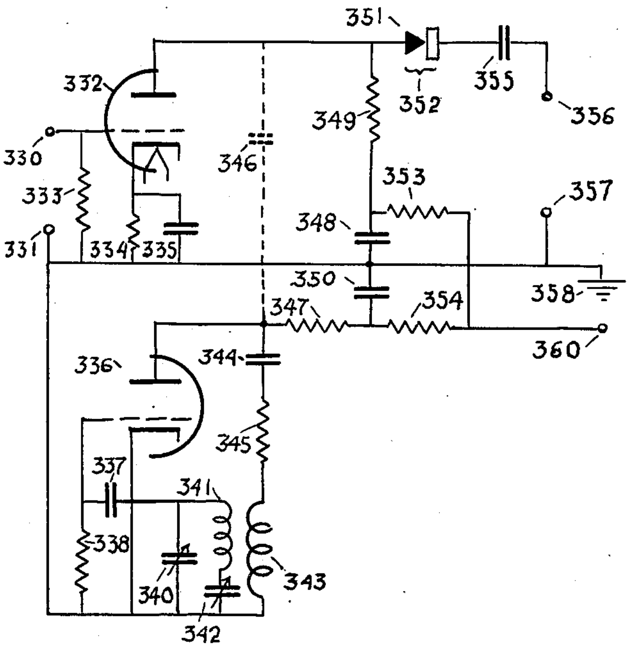
Fig. 3 is a diagram of a frequency converter.

One tube, or one section of a double tube, may be used for amplification, another tube or section may be used as the oscillator, and a diode may be used for rectification. In Fig. 3 tube 332 performs the function of amplification and mixing. This is shown as a triode, although a pentode may be used. Tube 336 in Fig. 3 is the local oscillator and may use any of the well known conventional local oscillating circuits. In this method of frequency conversion high values of oscillator voltage are not required and the tube may be worked only to the point of stability. Mixing is achieved, in the example shown in Fig. 3, through the internal plate to plate capacity 346 of the double triode, 332—336. With separate tubes a small condenser of a low value of capacity may be used as the coupling element between the two systems—plate to plate, grid to grid, or plate to grid, or a combination of these couplings. Inductive or resistive means of couplings may also be used.

In Fig. 2 the output (terminals 170, 171) is fed into the conventional first stage of radio frequency amplification (not illustrated) and then to the input of the converter stage through terminals 330 and 331 across the grid resistance 333 (see Fig. 3).

Tube 332 serves as a signal voltage amplifier and supplies means of exposing a signal for heterodyning to the local oscillator tube 336.

Tube 332 must be operated as a linear amplifier with a grid bias, one arrangement shown including resistance 334, and by-pass condenser 335. Other methods of biasing will serve.

The local oscillator 336 and accessory meshes may assume various forms. In the drawings I show the oscillating circuit which includes inductance 341, tuning condenser 340 and series condenser 342. Energy is fed to this system from the plate of 336 through condenser 344, resistance 345, and coil 343 which is inductively coupled to coil 341. This signal is applied to the grid of tube 336 through condenser 337 across grid resistance 338.

The plate potential of tube 336 is applied through plate load resistance 347 and plate filter circuit consisting of resistance 354 and filter condenser 350.

The high frequency voltage generated by the local oscillator 336 is applied to the plate of tube 332 through condenser 346 which in the case of double triode as shown may be the internal capacity between the plates of sections 332 and 336. The plate voltage of tube 332 is supplied through the plate load resistor 349 and the filtering mesh consisting of resistor 353 and by-pass condenser 348.

Terminal 360 is the source of plate voltage supply and 358 represents the ground for the system.

At the plate of 332 the signal comprises a combination of incoming signal from 332 mixed with radio frequency oscillation from tube 336. In order to complete the conversion to the intermediate frequency the diode rectifier 352 is provided. This is installed with its anode 351, connected to the plate of tube 332 in order to decrease the effects of tube noises from tube 332. The diode rectifier 352 is connected through the voltage isolating condenser 355 to the output terminal 356. The first stage of the intermediate frequency amplifier is connected to the terminals 356 and 357.

*Distortionless automatic volume control*

The conventional methods of automatic volume control operate upon the principle of varying tube characteristics under an impressed voltage, usually applied to the grids. This method is not permissible in the system of this disclosure because it involves the non-linear operation of the amplifier tubes which invites noise modulation of the carrier. One method of obtaining automatic volume control without subjecting the tubes to operation on the non-linear portion of the grid-voltage plate-current curve ($E_g—I_p$) is shown in Fig. 4. In this circuit, tube 404 is a conventional intermediate frequency output tube. Tube 405 and its output filter operate as a power stage to supply a positive direct current voltage for the operation of the automatic volume control tube or tubes. Signal for the operation of its grid may be taken from the output circuit of the last intermediate frequency amplifier 404, through a small condenser 410 between the plate of tube 404 and the grid resistance 406 of tube 405. Grid-cathode bias may be provided in the conventional manner by the cathode resistance 407 and by-pass condenser 408. This stage may be supplied with plate voltage through the filter consisting of resistor 423 and condenser 422 and the parallel plate resistor 409 coupled to the output rectifier through the condenser 411. Double rectification may be used as shown, employing the two crystal diodes 412 and 414 connected in the manner indicated. With decreased output it is possible to dispense with diode 412 while retaining the resistance 413. The filtering mesh, in the illustration shown (Fig. 4), consists of the resistances 416, 417 and 421, together with the by-pass condensers 415, 418 and 420. More or less sections may be used in the filter but the filtering should be adequate to prevent the coupling of the radio frequency signal through the automatic volume control tube 424 back into the amplifier system. Resistance 421 is a potentiometer of relatively low resistance value, carrying enough current to afford adequate voltage for the control of the grid voltage of the automatic volume control tube 424.

Tube 405 may be operated from a separate line of amplifier stages in order to isolate it from the effect of its own automatic volume control action.

In the illustration shown in Fig. 4, tube 424 is a pentode with a sharp rise in its family of plate current curves, although a triode may be used.

Resistance 421 serves as the input load to the automatic volume control tube 424 and may be made variable, allowing control over the amount of volume control action. By this means the automatic volume control action may be turned off if desired. The cathode and screen voltages should remain relatively fixed throughout the operation of the automatic volume control tube 424. These elements may be controlled by separate fixed voltages. In the illustration in Fig. 4 these voltages are controlled by a relatively heavy current drain through the bleeder comprising the resistances 427, 428 and 430. The voltage across resistance 430, by-passed by condenser 425, controls the cathode bias and the voltage across resistances 428 and 430, by-passed by condenser 431, controls the screen voltage on tube 424. In Fig. 4, terminal 436 connects to the plate voltage supply. Voltage is applied to the plate of tube 424 through a high value of resistance 426. The voltage is fed to the plate of tube 424 through the plate load resistor 426 and the conventional filter consisting of resistance 432 and its by-pass condenser 433. With no signal, the grid of tube 424 is at cut-off. The plate of tube 424 is connected in parallel with the plate of a tube such as tube 401 in the intermediate frequency cascade, or other appropriate impedance element in the cascade, through a relatively large coupling condenser 402. If it is desired the plate of tube 424 may be connected through a condenser across the output at terminal 434.

The output of this system is delivered to the conventional rectifying stage shown generally at 437 which connects to the following audio-amplifier, not shown, through terminals 434 and 435. A ground is provided at 403.

The operation is as follows. With no signal on the plate of 404 there will be a zero voltage across grid resistance 421, the input to tube 424. This produces a cut-off bias for tube 424, giving the tube 424 a very high plate impedance. With the application of a signal carrier to the grid of tube 405 a positive voltage will be applied to the grid of tube 424 and, as this voltage increases, the plate voltage of tube 424 applied through the plate feed resistance 426, drops to a very low value, shifting the operation of tube 424 from the relatively flat portion of the plate characteristic curve to the steep portion of the plate curve, applying a very low plate impedance as a shunt to the plate circuit of tube 401.

Additional automatic volume control tubes may be operated from the same power tube 405 in order to afford increased automatic volume control action.

*Tube noise suppression*

The suppression of tube noises in radio frequency circuits may be accomplished by capacity storage of the energy of the tube noise impulses as shown in Fig. 5 or by magnetic storage as shown in Fig. 5*a*. In Fig. 5 condenser 476 and resistance 475 are connected in series in the plate lead of tube 473. The tube noise impulse, impinging on the condenser 476, connected to the plate of tube 473 and plate load resistance 474, causes a current to flow through the resistance 475. Terminal 480 connects to a source of plate voltage, filter not shown. The value of the current through the resistor 475 is determined by the voltage of the impulse and the time constant, RC, of the combination, condenser 476 and resistance 475, with the result that a voltage drop, due to the impressed impulse, is caused in the resistance 475, isolating the effect from the output 477. This current also is found in a reactive or tuned circuit connected across the output terminals 477 and 478, but the voltage drop across this output load, not shown, will be relatively slight if the time constant, RC, of resistance 475 and condenser 476 is 20 or 30 times the period of the output load.

These tube noise suppressors should be designed with reference to the loads out of which and into which they operate, and should be connected as close to the plate terminal of tube 473 as practicable.

A tube noise suppressor consisting of condenser 470 and resistance 471 should also be inserted between the grid of tube 473 at its junction with its grid resistance 472 and its input transformer 468. Noise impulses affecting the grid of tube 473 are relatively slight but they excite the grid tuned circuit 468 to oscillation and this signal is amplified by the tube 473.

Figure 5 represents a generalized radio frequency tuned circuit of which terminals 465 and 466 represent the input to transformer 468 and terminals 477 and 478 represent the output connection to the utilizing device. A ground is provided at 467. Terminal 480 is the connection to the plate voltage supply.

*Input filter modifications*

Figure 1E:
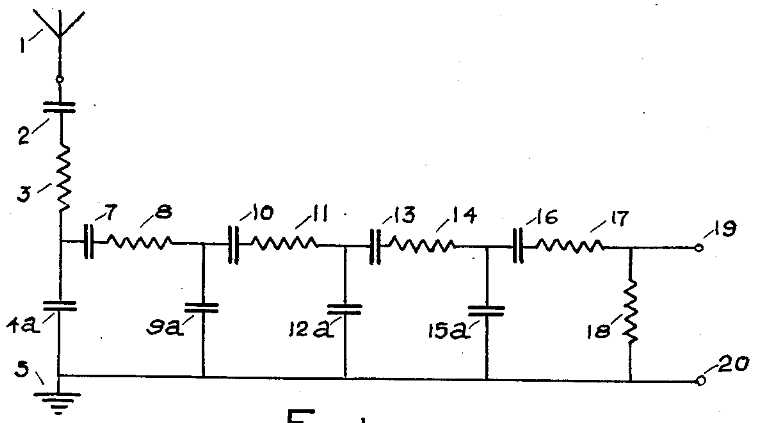
Figure 1F:
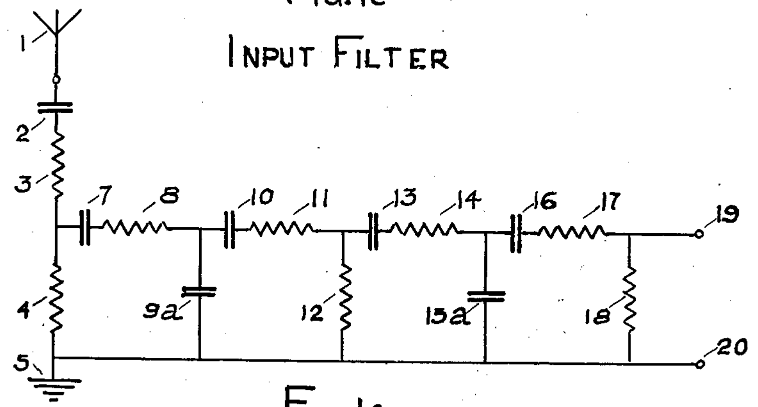
Figure 1G:
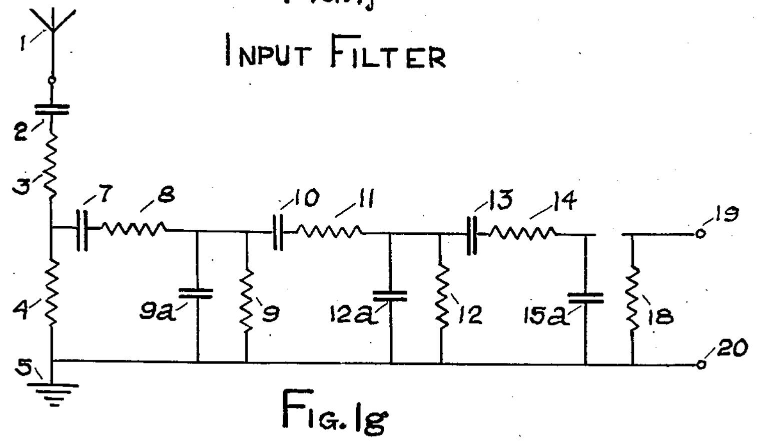

The grounding elements such as 4, 9, 12 etc. shown in Fig. 1 may be capacitive instead of resistive to make a low pass filter. See Figs. 1*e*, 1*f*, and 1*g*. In these drawings the numbers 1, 2, 3, 5, 7, 8, 10, 11, 13, 14, 16, 17, 18, 19, and 20 refer to the same parts as corresponding numbers in Figs. 1 and 4*a*, 9*a*, 12*a*, and 15*a* are capacitive grounding elements which give the filter certain low pass characteristics. Resistor 18 appears the same throughout Figs. 1, 1*e*, 1*f*, and 1*g* because it serves as the grid resistor of tube 23 in Fig. 1*a*. The phase rotating elements in the input filter may be made variable for control over attenuation and phase rotation. In Fig. 1, the condensers 2, 7, 10, 13, etc. may be made variable and the resistances 3, 8, 11, etc. may be made variable as shown in Fig. 1*b* (38, 39, 40, 41, 42, 43, 44, 45 etc.). In this modification 35 is the aerial, 36 aerial connection to the filter, 37 the ground, and resistances 46, 47, 48 etc. to 49, grounding elements of the filter which feeds into tube 50.

Fig. 1*c* shows a combination of two RC echelon filters with variable elements, originating at the same antenna 77, and its input terminal 78 and connected to ground 80 through resistance 79, each terminating at the grid of a radio amplifier tube, 100 and 101, the two tubes having their plates connected to the same output 104 and 105. See 81 to 98 in Fig. 1*c*, and the tubes 100 and 101. The plates of these tubes are connected together with a common voltage feed resistance 103 and source of plate voltage supply 106. The signal is fed to the output 104 through the condenser 102. If the phase of a given undesired sinuscidal signal of a specific frequency in the lower filter be rotated 180° farther than in the upper filter and if the amplitude be equalized by potentiometer 97, cancellation of the said undesired sinusoidal signal of said specific frequency will occur. Thus high pass filtering may be accompanied by the elimination of a specific frequency.

*Linear interference degenerator modifications*

In Fig. 2*a* is shown an arrangement of the linear interference degenerator circuit in which the phaser is placed in the input of the inversion stage rather than in the output, as shown in Fig. 2. The circuit of Fig. 2*a* may be connected to the filter shown in Fig. 1 through the circuit shown in Fig. 1*d*.

The signal is split at the common input terminals 52 and 54 of the amplifier tubes, 57 and 60 (Fig. 1*d*) at their common grid load 53. The input terminals 52 and 54 may be connected to the output terminals 19 and 20 of the input filter shown in Fig. 1. These two tubes should be matched and operated so that the signal will divide equally, giving signals at the plates of these two tubes 57 and 60 equal in amplitude and of the same phase.

Balancing of the plate loads for tubes 57 and 60 is accomplished by the potentiometer 69 connected between resistances 68 and 70. The center tap of potentiometer 69 is connected to the source of plate voltage at 74. The output terminals 72 and 73 of this balanced amplifier are connected to the plates of the tubes 57 and 60 through the condensers 67 and 71, respectively. The other circuit elements shown in Fig. 1*d* are conventional. Resistors 59 and 61, shunted by condensers 58 and 64, provide cathode bias for the tubes 57 and 60 while the potentiometers, 63 and 66, shunted by condensers 62 and 65, are connected to a common source of screen voltage 75 and afford screen voltage adjustments for the equalization of the operation of the tubes. A ground is shown at 55.

The upper tube 57 (Fig. 1*d*) is coupled to the grid of the tube 205 (Fig. 2*a*) by connecting terminals 72 (Fig. 1*d*) and 180 (Fig. 2*a*). The phaser, consisting of coil 193 and condenser 194 in Fig. 2*a* is similar to that described in Fig. 2 (151 and 152) and is included in the plate circuit of tube 57 (Fig. 1*d*), above the input point to the grid of tube 205, with the modification of the mesh consisting of resistances 198 and 199 and condensers 196 and 197 for bucking stray capacity coupling through the grid load 187. The condenser 191 is used to couple this mesh to the top of the phaser and to impose the same phase alteration as imposed upon the signal by condenser 189. The resistance 188 and condenser 189 serve as a tube noise suppressor. Resistance 192 matches the phase and voltage effect of resistance 188. Switch 195 may be provided for convenience in adjusting the circuit and shield 200 prevents variations in capacity to ground during tuning (Fig. 2*a*).

The output of the other tube 60 in Fig. 1*d* is connected to the cathode input load (185 in Fig. 2*a*), by joining the terminals 73 (Fig. 1*d*) and 181 (Fig. 2*a*) and ground 183, common to ground 55 in Fig. 1*d*. The condenser 182 and resistance 184 compensate for resistance 188 and condenser 189 in the grid input circuit. Provision is made for the equalization of signal voltages by the resistance 187 and provision is made for cancelling capacitive transfer through tube 211. See resistance 201 and condensers 202 and 203. This mesh also provides for the phase equalization of the signal between the inputs to the two tubes 205 and 211. Condenser 204 isolates the grid-cathode bias arrangement of tube 211 from ground, and condenser 186 matches the stray capacity of the phaser shield 200.

In the output of the tube 205 is the resistance 218 and the condenser 217 to compensate for the cathode mesh in the lower tube 211. The plate circuits of tubes 205 and 211 are connected by the common output terminals 227 and 228 to a load (not shown) which may be reactive through the tube noise suppressors 223—225 and 224—226. The potentiometer 220, connected to the plate supply voltage at terminal 230 through the filter, consisting of resistance 221 and condenser 222, provides a means of equalizing the plate voltage supply loads.

The coils 208 and 214 in Fig. 2*a* serve to absorb the screen partition impulses. The other circuit elements in Fig. 2*a* are conventional: resistors 206 and 212, shunted by condensers 207 and 213, provide the input bias to tubes 205 and 211, while the potentiometers 209 and 215, connected to the common screen voltage terminal 229, and shunted respectively by condensers 210 and 216, provide voltage adjustments for the screens of tubes 205 and 211.

Figure 2B:
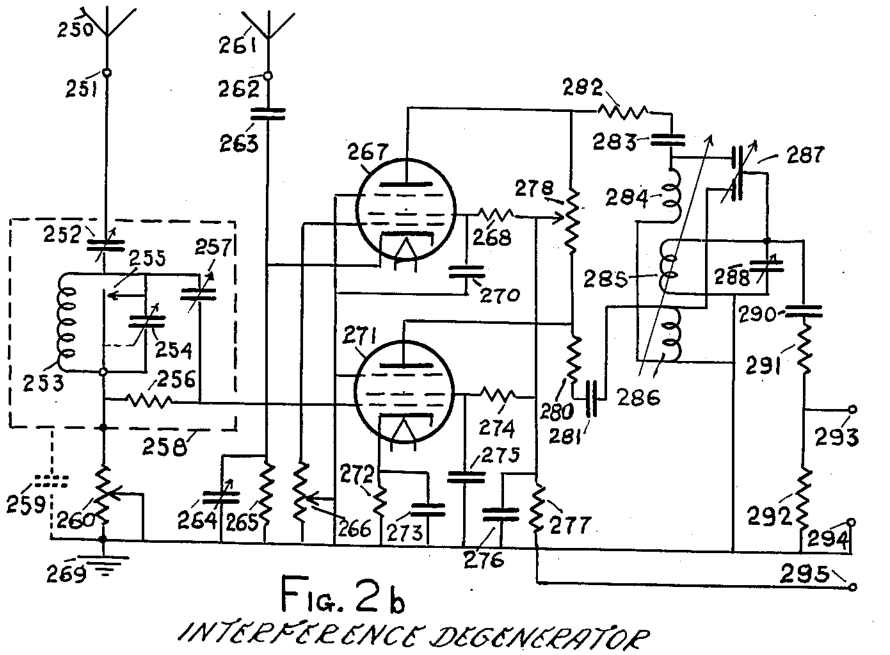
Figures 2C, 2D:
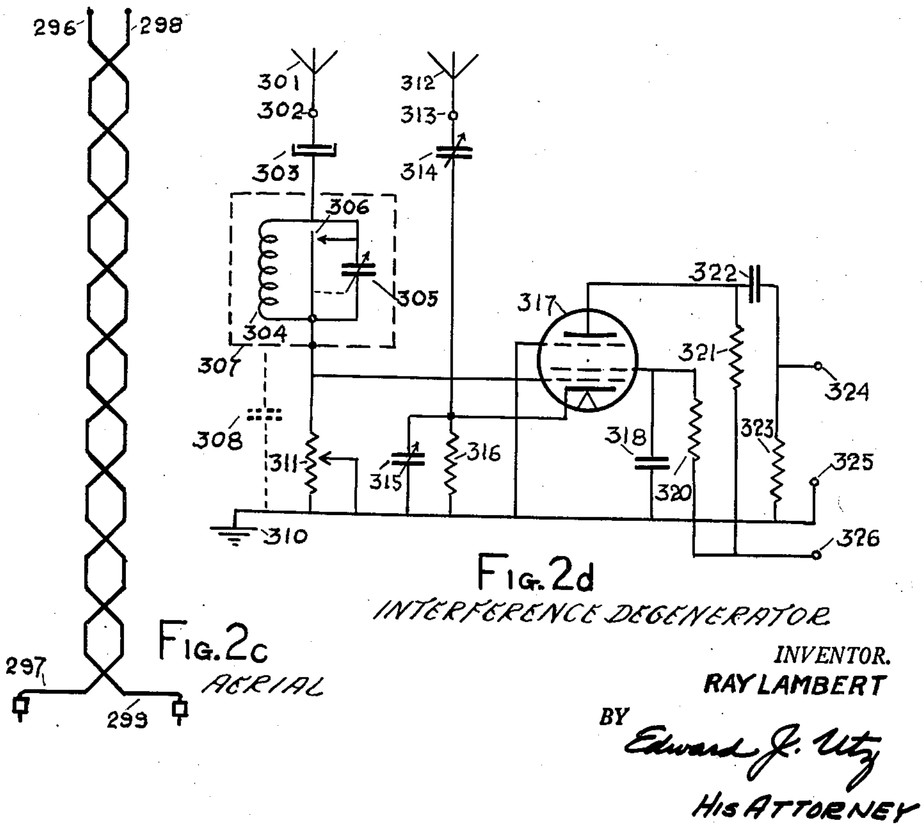

Fig. 2*b* shows the signal splitting arrangement and signal phaser consisting of coil 253 and condenser 254 incorporated in the input circuit of two tubes 267 and 271 and shows a double-primary output transformer consisting of coils 284, 285 and 286. Signal splitting here is accomplished by using two aerials 250 and 261 connected to the apparatus circuit at terminals 251 and 262. These aerials are constructed so that each is equally disposed to the radio field, regardless of the direction of that field, and designed so as to cancel inductive coupling. See Fig. 2*c*. The cross-overs are in a plane perpendicular to the plane of the paper and separated by a distance equal to the distance between vertical members. There should be the same number of transposition sections presented to the radio field from any point of view. One of the aerials is indicated in Fig. 2*c* by 296—297, and the other by 298—299.

One of the aerials 250 in Fig. 2*b* is connected to the phaser, consisting of coil 253 and condenser 254, through the condenser 252 and through the phaser to the variable grid load resistance 260. This phaser is enclosed by a shield 258 connected to the top of the grid resistance 260 for the purpose of maintaining the value of capacity to ground constant. Attached to condenser 254 is a switch 255 which closes when the condenser is turned to the extreme maximum setting. This is for convenience in adjusting the circuit.

The phaser circuit consisting of coil 253 and condenser 254 in Fig. 2*b* is subject to oscillation under the impact of noise impulses (a conservative system possessing two interchangeable modes of energy storage) and, although not in the direct voltage amplifier cascade, is coupled to the input of tube 271 through aerial-ground capacity and the grid load 260. In order to counteract this effect energy from the phaser is fed through condenser 257 and resistance 256. When the condenser 257 is properly adjusted the spurious signal voltage caused by noise impulses upon the phaser are impressed across resistance 256, balancing the corresponding effect across resistance 260. A condenser, not shown in Fig. 2*b* but shown at 256*a* in Fig. 2*e*, may be shunted across resistance 256 to compensate for the phase angle change caused by the stray capacity 259 between the phaser shield 258 and ground. The ground connection 269 completes the aerial circuit.

Aerial 261 is connected to the cathode load 265 of tube 267 through condenser 263. Potentiometer 260 affords means for equalizing the signals through the two tubes 267 and 271. Condenser 264 compensates for the capacity to ground 259 from the phaser shield 258. Potentiometer 266, through which the grounded grid is grounded, assists in neutralizing the cathode-anode capacity coupling in tube 267.

In Fig. 2*b* the outputs of the tubes 267 and 271 are connected to the primaries 284 and 286 of the transformer through tube noise suppressors 282—283 and 280—281, each consisting of a condenser and resistance in series. This transformer is provided with a means for equalizing the coupling between the two primaries, coils 284 and 286, and the secondary coil 285. It is also provided with a differential condenser 287 for equalizing the capacity coupling. The secondary 285, shunted by tuning condenser 288, is connected to the output terminal 293 through the tube noise suppressor consisting of condenser 290 and resistance 291. Terminals 293 and 294 afford connection to the following stage. Resistance 292 is the grid resistance of the following tube which is not shown. Potentiometer 278, serving to equalize the voltage feed loads of tubes 267 and 271, is connected to the plate voltage supply terminal 295 through the filter consisting of resistance 277 shunted by condenser 276.

Other circuit elements shown in Fig. 2*b* are conventional. Resistance 272, shunted by condenser 273, provides the input bias for tube 271 while resistors 268 and 274, shunted by condensers 270 and 275, respectively, are screen voltage dropping resistors.

Figure 2E:
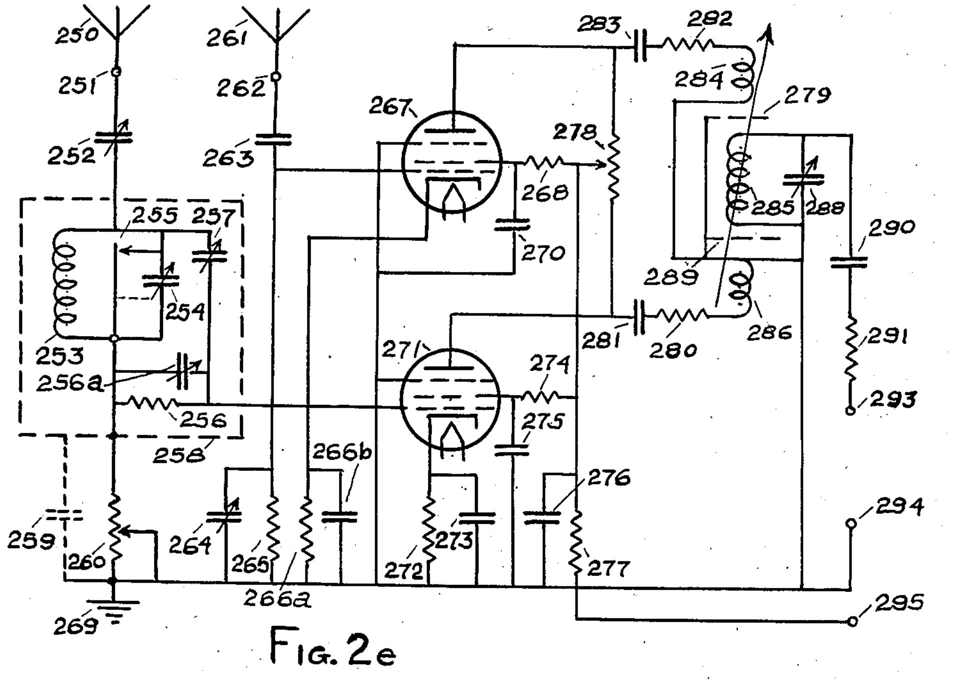

It is possible to use these two tubes 267 and 271 as grid input tubes by employing the output transformer for reversal. To do this, the connections to coil 286 should be reversed, the differential condenser 287 may be eliminated if desired and coils 284 and 286 shielded from the secondary coil 285 and condenser 288 by a Faraday shield (not shown in Fig. 2*b*). See Fig. 2*e*. Faraday shields 279 and 289 are used to control unbalanced capacity coupling between the primary coils 284 and 286 and the secondary 285. The differential condenser 287 (shown in Fig. 2*b*) may be employed if desired. The Faraday shields 279 and 289 may be omitted if desired. In Fig. 2*e* other numbers similar to those in Fig. 2*b* refer to similar parts. Note that resistance 265, which is shunted by a condenser 264, is in the grid circuit of tube 267 in Fig. 2*e* and that the resistor 266*a* is the cathode bias resistor of tube 267 and is shunted by a bypass condenser 266*b*.

Fig. 2*d* shows a simplified circuit of the linear interference degenerator employing a single tube with few circuit corrections and made possible by utilizing low values of input grid and cathode loads. Successful operation depends upon the reduction of phase relations by the use of these low values of grid and cathode resistances and upon a capacity coupling between aerials 301 and 312 to ground through resistance 316 of a very low value in comparison to the capacity setting of condenser 305. In this simplified version the values of the input resistances 311 and 316 should be of the order of a few hundred ohms.

Figures 2F, 2G:
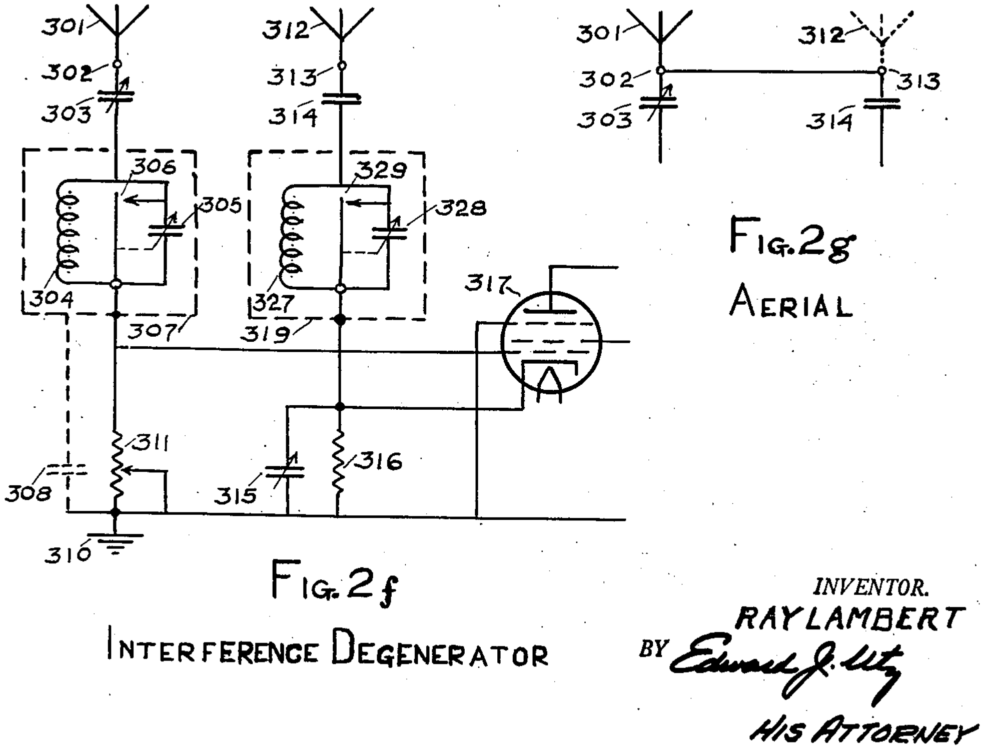

The aerials 301 and 312 in Fig. 2*d* should be of equal dimensions, equally disposed to the radio field, should avoid inductive coupling and, as far as possible, capacitive coupling between each other. A transposition aerial such as described in Fig. 2*c* may be used. In operation this circuit shown in Fig. 2*d* may be regarded as a bridge circuit. At the top the two aerials are connected in a common field (or may be joined by connecting terminals 302 and 313 as shown in Fig. 2*g*) and at the bottom the two aerial circuits terminate in the common ground 310. The condenser 314 is set equal to condenser 303 to provide two equal bridge arms and resistance 311 is adjusted to equal resistance 316. Condenser 315 is set to match the stray capacity 308 between the phaser shield 307 and ground, giving the same phase and voltage across the two resistances 311 and 316. One of these bridge points (the top of resistance 311) is connected to the grid of tube 317 and the other (the top of resistance 316) is connected to the cathode of tube 317. With the phaser, consisting of coil 304 and condenser 305, shorted by the switch 306, equal signal voltages, including desired signal and interfering impulses, are applied to the grid and cathode of tube 317. With proper adjustments, allowing for a slight difference in amplification between these two inputs, the signal voltage, for all frequencies, will be zero at the plate of tube 317. The phaser, consisting of coil 304 and condenser 305, upon being tuned to resonance with the desired radio signal, produces a phase change in the desired signal which will approach 180° if the impedance across coil 304 is high in comparison to the value of the resistance 311 (shunted by capacity 308). In this manner the radio signal from the grid input is added in phase to the radio signal from the cathode input at the plate of tube 317 while the noise impulses, being of a much lower effective "frequency" are unaffected, relatively, by the phaser causing the noise signal to cancel at the plate of tube 317.

The plate voltage supply at terminal 326 in Fig. 2*d* is applied to the plate of tube 317 through the load resistance 321 and the screen voltage, through the resistor 320, shunted by condenser 318. The output is applied across resistance 323 through condenser 322. The output terminals 324 and 325 are connected to the next stage of amplification or other utilization device.

Two phasers may be employed in any of these interference degenerator designs shown in Figs. 2, 2*a*, 2*b*, 2*d*, and 2*e*. See Fig. 2*f*. In Fig. 2*f* coil 327 and condenser 328 constitute a second phaser, inserted between aerial condenser 314 and the cathode resistance 316, affording additional control of the radio signal phase reversal. A switch 329 similar to 306 may be used if desired in making initial adjustments and 319 is a phaser shield, connected to the cathode of tube 317 in Fig. 2*f*. Other numbers in Fig. 2*f* refer to parts similar to those of corresponding numbers in Fig. 2*d*.

One aerial may be substituted for the two aerials 250 and 261 in Fig. 2*b* and aerials 301 and 312 in Fig. 2*d* by connecting the aerial inputs 251 and 262 in Fig. 2*b* and 302 and 313 in Fig. 2*d*, together. See Fig. 2*g*. Numbers in Fig. 2*f* refer to the same parts as corresponding numbers in Fig. 2*d*. This increases the capacity coupling to ground, however, and increases the noise ratio.

A triode may be used in place of the pentode 424 shown in Fig. 4. See Fig. 4*a*. In Fig. 4*a* triode 438 takes the place of pentode 424 in Fig. 4. Other numbers in Fig. 4*a* indicate parts similar to parts indicated by corresponding numbers in Fig. 4. Other means of control may be employed with the automatic volume control tube 424, such as cathode input. See Fig. 4*b*. In Fig. 4*b* triode 439 takes the place of pentode 424 in Fig. 4. Other numbers in Fig. 4*b* indicate parts similar to parts indicated by corresponding numbers in Fig. 4. Note that the resistor 421 serves as a variable cathode resistor in Fig. 4*b*, instead of a grid resistor as in Fig. 4, and that the polarity of each of the diode rectifiers 412 and 414 is reversed in Fig. 4*b*.

*Tube noise suppression modifications*

The tube noise suppressors consisting of condenser 470 and resistance 471 in the grid circuit of tube 473, Fig. 5, and condenser 476 and resistance 475 in the plate circuit of tube 473 may be reversed, with the condensers placed adjacent to the tube causing only slight changes in operation. See the noise suppressors 470—471 and 475—476 in Fig. 5*e*. Other numbers in Fig. 5*e* correspond to similar numbers in Fig. 5. The grid grounding resistor 472 and the plate resistor 474 may be connected between the condenser and resistance portions of the noise suppressor. See Fig. 5*f*. The numbers in Fig. 5*f* correspond to similar numbers in Fig. 5.

Fig. 5*a* shows the use of choke coils 485 and 491 of a high L/R (time constant characteristic) in place of the condenser-resistance noise suppressors (470—471, 475—476 in Fig. 5). The design of coils 485 and 491 should include low distributed capacity and a natural frequency greatly in excess of the band being received. The high L/R value is attained by using extremely low values of R. In this case the plate voltage may be fed directly to the plate of tube 486 through the primary of the coupling transformer 492 from the plate voltage supply terminal 495. In Fig. 5*a*, coil 487 has characteristics similar to coils 485 and 491 and is used to reduce the noise effect due to the screen-grid partition current through the process of momentary storage of energy. Resistance 488 and condenser 489 are the conventional isolating filter in the screen voltage supply.

Other circuit elements in Fig. 5*a* are conventional. The input terminals 481 and 482 are connected to the primary of the input transformer 484 which is grounded at 483 and the output is indicated at terminals 493 and 494.

Figs. 5*b*, 5*c* and 5*d* show a method of controlling the factor of tube noise due to the screen partition current. However, these connections modify greatly the operation of the tube. Its operation with this connection resembles triode operation but is slightly more quiet than the operation afforded by connecting screen and plate directly.

In Figs. 5*b*, 5*c* and 5*d* the screen bypass condensers 501, 511, 522 are connected to the plate of tubes 500, 509 and 520 instead of the usual connection to ground. The connection of the screen to the plate through condenser 501, 511, or 522 suppresses only that portion of the tube noise due to the screen partition current and is not a substitute for the tube noise suppressors shown in Fig. 5. The screen grid voltage supply is then provided by a series resistor 502 in Fig. 5*b*, 512 in Fig. 5*c* and 523 in Fig. 5*d*. The plate voltage is applied through resistance 503 in Fig. 5*b*, 513 in Fig. 5*c* and through resistance 523 and 524 in Fig. 5*d*, taken from the plate voltage supply terminals 508, 517 and 528 respectively. Output coupling condensers 504, 514 and 525 connect to output terminals 505, 515 and 526 respectively. Grounds are provided at 507, 510 and 521 in Figs. 5*b*, 5*c* and 5*d*, connected to the grounded output terminals 506, 516 and 527 respectively. Other arrangements of voltage feed to the screen and plate of tubes may be employed.

*Shielding*

Shielding, not described in the above disclosure, should be adequate to prevent the entrance of noise impulses and desired signals excepting through the aerial and to prevent undesirable coupling between circuit components.

I am aware that the device herein described is susceptible of consideration variation without departing from the spirit of my invention, and therefore, I have claimed my invention broadly as indicated by the appended claims.

Having thus described my invention what I claim is new and useful and desire to secure by United States Letters Patent is:

1. A radio noise reducing system incorporated in a wave-signal receiver comprising, in combination: untuned means for collecting signals, comprising one or more aerial circuits having constants selected to avoid resonance near the receiver band; aperiodic signal filtering means comprising an impedance path consisting of one or more phase rotating pairs of circuit elements connected in series, each pair of said phase rotating circuit elements consisting of a resistor and capacitor in series, each of said pairs grounded through an aperiodic circuit element; an aperiodic coupling unit, comprising one or more thermionic tubes with associated circuits consisting of resistors and capacitors, and means providing for the linear operation of said thermionic tubes; means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, means for filtering out the energy of said noise impulses, and means for the linear operation of the said thermionic vacuum tubes; means for the noiseless frequency conversion of the wave-signal frequency to a predetermined intermediate frequency, comprising the combination of means for the linear amplification of the original wave signal, means for the local generation of noise free sinusoidal oscillations, means for heterodyning said locally generated noise free oscillations with the wave signal of the original frequency, and predominately unilaterally conducting means for converting the heterodyned signal into the corresponding signal of the desired intermediate frequency; and means for the automatic control of the radio receiver gain without subjecting thermionic amplifier tubes in the radio amplifier cascade to nonlinear operation, comprising means for varying the impedance of an interstage coupling unit in said radio amplifier cascade, which means comprise the plate circuit of a thermionic control tube connected in parallel with said radio interstage coupling unit, the plate voltage of said thermionic control tube fed through a high resistance, means for supplying the control voltage to the input of said control tube provided by a power amplifier followed by a rectifier feeding into a filter, the output of said filter connected to the input of said control tube, and said power amplifier having an input coupled to the output of the intermediate frequency amplifier.

2. A radio noise reducing system incorporated in a wave-signal receiver comprising, in combination: untuned means for collecting signals, comprising one or more aerial circuits having constants selected to avoid resonance near the receiver band; aperiodic signal filtering means comprising an impedance path consisting of one or more phase rotating pairs of circuit elements connected in series, each pair of said phase rotating circuit elements consisting of a resistor and capacitor in series, each of said pairs grounded through an aperiodic circuit element; an aperiodic coupling unit, comprising one or more thermionic tubes with associated circuits consisting of resistors and capacitors, and means providing for the linear operation of said thermionic tubes; means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, means for filtering out the energy of said noise impulses, and means for the linear operation of the said thermionic tubes; and means for the automatic control of the radio receiver gain without subjecting thermionic amplifier tubes in the radio amplifier cascade to nonlinear operation, comprising means for varying the impedance of an interstage coupling unit in said radio amplifier cascade, which means comprise the plate circuit of a thermionic control tube connected in parallel with said radio interstage coupling unit, the plate voltage of said thermionic control tube fed through a high resistance, means for supplying the control voltage to the input of said control tube provided by a power amplifier followed by a rectifier feeding into a filter, the output of said filter connected to the input of said control tube, and said power amplifier having an input coupled to the output of the intermediate frequency amplifier.

3. A radio noise reducing system incorporated in a wave-signal receiver comprising, in combination: untuned means for collecting signals, comprising one or more aerial circuits having constants selected to avoid resonance near the receiver band; a periodic signal filtering means comprising an impedance path consisting of one or more phase rotating pairs of circuit elements connected in series, each pair of said phase rotating circuit elements consisting of a resistor and capacitor in series, each of said pairs grounded through an aperiodic circuit element; an aperiodic coupling unit, comprising one or more thermionic tubes with associated circuits consisting of resistors and capacitors, and means providing for the linear operation of said thermionic tubes; means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, means for filtering out the energy of said noise impulses, and means for the linear operation of the said thermionic vacuum tubes; and means for the noiseless frequency conversion of the wave-signal frequency to a predetermined intermediate frequency, comprising the combination of means for the linear amplification of the original wave signal, means for the local generation of noise free sinusoidal oscillations, means for heterodyning said locally generated noise free oscillations with the wave signal of the original frequency, and predominately unilaterally conducting means for converting the heterodyned signal into the corresponding signal of the desired intermediate frequency.

4. A radio noise reducing system incorporated in a wave-signal receiver comprising, in combination: untuned means for collecting signals, comprising one or more aerial circuits having constants selected to avoid resonance near the receiver band; aperiodic signal filtering means comprising an impedance path consisting of one or more phase rotating pairs of circuit elements connected in series, each pair of said phase rotating circuit elements consisting of a resistor and capacitor in series, each of said pairs grounded through an aperiodic circuit element; an aperiodic coupling unit, comprising one or more thermionic tubes with associated circuits consisting of resistors and capacitors, and means providing for the linear operation of said thermionic tubes; means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; and means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, means for filtering out the energy of said noise impulses, and means for the linear operation of the said thermionic vacuum tubes.

5. A radio noise reducing system incorporated in a wave-signal receiver comprising, in combination: untuned means for collecting signals, comprising one or more aerial circuits having constants selected to avoid resonance near the receiver band; aperiodic signal filtering means comprising an impedance path consisting of one or more phase rotating pairs of circuit elements in series, each pair of said phase rotating circuit elements consisting of a resistor and capacitor in series, each of said pairs grounded through an aperiodic circuit element; an aperiodic coupling unit, comprising one or more thermionic tubes with associated circuits consisting of resistors and capacitors, and means providing for the linear operation of said thermionic tubes; and means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches.

6. A radio noise reducing system incorporated in a wave-signal receiver comprising, in combination: untuned means for collecting signals, comprising one or more aerial circuits having constants selected to avoid resonance near the receiver band; means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, and means for the linear operation of the said thermionic vacuum tubes; means for the noiseless frequency conversion of the wave-signal frequency to a predetermined intermediate frequency, comprising the combination of means for the linear amplification of the original wave signal, means for the local generation of noise free sinusoidal oscillations, means for heterodyning said locally generated noise free oscillations with the wave signal of the original frequency, and predominately unilaterally conducting means for converting the heterodyned signal into the corresponding signal of the desired intermediate frequency; and means for the automatic control of the receiver gain without subjecting thermionic amplifier tubes in the radio amplifier cascade to nonlinear operation, comprising means for varying the impedance of an interstage coupling unit in said radio amplifier cascade, which means comprise the plate circuit of a thermionic control tube connected in parallel with said radio interstage coupling unit, the plate voltage of said thermionic control tube fed through a high resistance, means for supplying the control voltage to the input of said control tube provided by a power amplifier followed by a rectifier feeding into a filter, the input of said filter connected to the input of said control tube, and said power amplifier having an input coupled to the output of the intermediate frequency amplifier.

7. A radio noise reducing system incorporated in a wave-signal receiver comprising, in combination: untuned means for collecting signals, comprising one or more aerial circuits having constants selected to avoid resonance near the receiver band; means for degenerating noise impulses in the presence of a wave-signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, and means for the linear operation of the said thermionic vacuum tubes; and means for the automatic control of the receiver gain without subjecting thermionic amplifier tubes in the radio amplifier cascade to nonlinear operation, comprising means for varying the impedance of an interstage coupling unit in said radio amplifier cascade, which means comprise the plate circuit of a thermionic control tube connected in parallel with said radio interstage coupling unit, the plate voltage of said thermionic control tube fed through a high resistance, means for supplying the control voltage to the input of said control tube provided by a power amplifier followed by a rectifier feeding into a filter, the input of said filter connected to the input of said control tube, and said power amplifier having an input coupled to the output of the intermediate frequency amplifier.

8. A radio noise reducing system incorporated in a wave-signal receiver comprising, in combination: untuned means for collecting signals, comprising one or more aerial circuits having constants selected to avoid resonance near the receiver band; means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, and means for the linear operation of the said thermionic vacuum tubes; and means for the noiseless frequency conversion of the wave-signal frequency to a predetermined intermediate frequency, comprising the combination of means for the linear amplification of the original wave signal, means for the local generation of noise free sinusoidal oscillations, means for heterodyning said locally generated noise free oscillations with the wave signal of the original frequency, and predominately unilaterally conducting means for converting the heterodyned signal into the corresponding signal of the desired intermediate frequency.

9. A radio noise reducing system incorporated in a wave-signal receiver comprising, in combination: untuned means for collecting signals, comprising one or more aerial circuits having constants selected to avoid resonance near the receiver band; means for degenerating noise impulses in the presence of a wave signal, comprising means for the equal division of the signal into two circuit branches, means for the inversion of the noise signal in one of said branches, means for the combination and cancellation of the noise signals from the two said branches, means for the phase rotation of the wave signal included in series with one of the aforesaid circuit branches, and means for the combination, in phase, of the wave signals from the aforesaid two circuit branches; and means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, and means for the linear operation of the said thermionic vacuum tubes.

10. A radio noise reducing system incorporated in a wave-signal receiver comprising, in combination: means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, means for filtering out the energy of said noise impulses, and means for the linear operation of the said thermionic vacuum tubes; means for the noiseless frequency conversion of the wave-signal frequency to a predetermined intermediate frequency, comprising the combination of means for the linear amplification of the original wave signal, means for the local generation of noise free sinusoidal oscillations, means for the heterodyning of said locally generated noise free oscillations with the wave signal of the original frequency, and predominately unilaterally conducting means for converting the heterodyned signal into the corresponding signal of the desired intermediate frequency; and means for the automatic control of the radio receiver gain without subjecting thermionic amplifier tubes in the radio amplifier cascade to nonlinear operation, comprising means for varying the impedance of an interstage coupling unit in said radio amplifier cascade, which means comprise the plate circuit of a thermionic control tube connected in parallel with said radio interstage coupling unit, the plate voltage of said thermionic control tube fed through a high resistance, means for supplying the control voltage to the input of said control tube provided by a power amplifier followed by a rectifier feeding into a filter, the output of said filter connected to the input of said control tube, and said power amplifier having an input coupled to the output of the intermediate frequency amplifier.

11. A radio noise reducing system incorporated in a wave-signal receiver comprising, in combination: means for the elimination of the noise effects of thermionic vacuum tubes, which noise effects are caused by certain unidirectional impulses within said tubes, comprising means for the momentary storage of the energy of said tube noise impulses and the conversion if said impulses into impulses having greater time constants, means for filtering out the energy of said noise impulses, and means for the linear operation of the said thermionic vacuum tubes; and means for the automatic control of the radio receiver gain without subjecting thermionic amplifier tubes in the radio amplifier cascade to nonlinear operation, comprising means for varying the impedance of an interstage coupling unit in said radio amplifier cascade, which means comprise the plate circuit of a thermionic control tube connected in parallel with said radio interstage coupling unit, the plate voltage of said thermionic control tube fed through a high resistance, means for supplying the control voltage to the input of said control tube provided by a power amplifier followed by a rectifier feeding into a filter, the output of said filter connected to the input of said control tube, and said power amplifier having an input coupled to the output of the intermediate frequency amplifier.

12. A radio noise reducing system incorporated in a wave-signal receiver comprising, in combination: means for the elimination of the noise effects of thermionic vacuum tubes, which noise effects are caused by certain unidirectional impulses within said tubes, comprising means for the momentary storage of the energy of said tube noise impulses and the conversion of said impulses into impulses having greater time constants, means for filtering out the energy of said noise impulses, and means for the linear operation of the said thermionic vacuum tubes; and means for the noiseless frequency conversion of the wave-signal frequency to a predetermined intermediate frequency, comprising the combination of means for the linear amplification of the original wave signal, means for the local generation of noise free sinusoidal oscillations, means for the heterodyning of said locally generated noise free oscillations with the wave signal of the original frequency, and predominately unilaterally conducting means for converting the heterodyned signal into the corresponding signal of the desired intermediate frequency.

13. A radio noise degenerator for a wave-signal receiver comprising: two aerial circuits including two aerials, each nonresonant near the receiver band, having similar electrical constants and physical dimensions, equally exposed to the radio field, connection to ground for the first said aerial provided by a series arrangement of a first aerial capacitor, a tuned phaser consisting of an inductance and variable capacitor in parallel, and a first aerial grounding resistor having a resistance of low value relative to the wave-signal impedance of the said tuned phaser, connection to ground for the second of said aerials provided by a series arrangement of a second aerial capacitor and second aerial grounding resistor, said second aerial capacitor and second aerial grounding resistor matched, respectively, with the said first aerial capacitor and first aerial grounding resistor, a small adjustable capacitor shunting the second aerial grounding resistor, said phaser provided with a shield connected to the circuit of the said first aerial at a point between the said phaser and the said first aerial grounding resistor; and a thermionic tube with associated aperiodic input, output, and voltage control circuits, the components of said circuits consisting of resistors and capacitors, said components having values providing for the linear operation of said thermionic tube, the control grid of said thermionic tube connected to ground through the above said first aerial grounding resistor, the cathode of said thermionic tube connected to ground through the said second aerial grounding resistor, and the output circuit of said thermionic tube provided with means connected to said thermionic tube for deriving wave signals from the above said radio noise degenerator.

14. A radio noise degenerator for a wave-signal receiver comprising: an aerial having constants chosen to avoid resonance near the receiver band, said aerial connected to ground through two parallel branch circuits, connection to ground through the said first aerial branch circuit provided by a series arrangement of a first aerial capacitor, a tuned phaser consisting of an inductance and variable capacitor in parallel, and a first aerial grounding resistor having a resistance of low value relative to the wave-signal impedance of the said tuned phaser, and connection to ground through the said second aerial branch provided by a series arrangement of a second aerial capacitor and second aerial grounding resistor, said second aerial capacitor matched to the first aerial capacitor and said second aerial grounding resistor matched to said first aerial grounding resistor, a small adjustable capacitor shunting the said second aerial grounding resistor, said phaser provided with a shield connected to the said first aerial branch at a point between the said phaser and the said first aerial grounding resistor; and a thermionic tube with associated aperiodic input, output, and voltage control circuits, the components of said circuits consisting of resistors and capacitors, said components having values providing for the linear operation of said thermionic tube, the control grid of said thermionic tube connected to ground through the above said first aerial grounding resistor, the cathode of said thermionic tube connected to ground through the said second aerial grounding resistor, and the output of said thermionic tube provided with means connected to said thermionic tube for deriving wave signals from the above said radio noise degenerator.

15. A radio noise degenerator for a wave-signal receiver comprising: two aerial circuits including two aerials, each aerial nonresonant near the receiver band, having similar electrical constants and physical dimensions, equally exposed to the radio field and thereby providing for the collection of equal amounts of signal energy, said equal and equally exposed aerials in effect constituting means for the equal division of the signal into two circuit branches, connection to ground for the first said aerial provided by a series arrangement of the first aerial capacitor, a tuned phaser consisting of an inductance and variable capacitor in parallel, and a first aerial grounding resistor having a resistance of low value relative to the wave-signal impedance of the said tuned phaser, a shield surrounding the above said phaser connected to the said first aerial circuit at a point between the said phaser and the said first aerial grounding resistor constituting means for maintaining a constant distributed capacity shunting the said first aerial grounding resistor, said tuned phaser constituting means for the phase rotation of the wave-signal voltage impressed across the above said first aerial grounding resistor, connection to ground for the said second aerial provided by a series arrangement of a second aerial capacitor and second aerial grounding resistor, said second aerial capacitor and said first aerial grounding resistor made adjustable for matching, respectively, the values of the first aerial capacitor and second aerial grounding resistor and constituting means for equalizing the noise-signal voltages applied across the said first aerial grounding resistor and the said second aerial grounding resistor, and a small adjustable capacitor shunting the second aerial grounding resistor, whereby the distributed capacity to ground around the first aerial grounding resistor is compensated, for the purpose of signal phase adjustment, constituting means for the preservation of similar noise-impulse shapes impressed across the said first aerial grounding resistor and the said second aerial grounding resistor; and a thermionic tube with associated aperiodic input, output, and voltage control circuits, the components of said circuits consisting of resistors and capacitors, said components having assigned values resulting in the linear operation of said thermionic tube thereby constituting means for the linear operation of said thermionic tube, the grid of said thermionic tube connected to ground through the above said first aerial grounding resistor, the cathode of said thermionic tube connected to ground through the said second aerial grounding resistor, which arrangement of said grid and said cathode of said thermionic tube constitutes means for the inversion of the noise signal voltage impressed across the first aerial grounding resistor and means for the cancellation of said noise signal, at the plate of said thermionic tube, with the noise signal derived from the noise-signal voltage impressed across the said second aerial grounding resistor, and also which said arrangement of said grid and said cathode of said thermionic tube in conjunction with the above said phaser causing phase rotation of the wave-signal impressed across above said first aerial resistor constitutes means for the combination of the wave signals from the aforesaid two aerial circuits, in phase, at the plate of the said thermionic tube, and the output coupling circuit of said thermionic tube provided with means connected to said thermionic tube for deriving from said radio noise degenerator wave signals relatively free from the effects of electrical noise impulses, which noise impulses enter the receiver through the aerial.

16. A relatively noiseless frequency converter for a superheterodyne wave-signal receiver comprising, in combination: a first section of a double triode with associated input, output, and voltage control circuits with voltage and space current supply means, the components of said circuits having assigned values providing for the linear operation of said first section of said double triode thereby constituting means for the linear operation of said first section of said double triode, the control grid of said first section of said double triode having input means for receiving wave signals, the plate of said first section of said double triode supplied with space current through a parallel plate feed resistor; means for generating noise-free oscillations comprising the second section of the said double triode, the grid of said second section of said double triode connected to ground through a grid resistor, the plate supplied with space current through a parallel plate feed resistor, a tuned oscillator circuit comprising an inductance and variable capacitor in parallel, means for coupling said tuned oscillating circuit to the grid of said second section of said double triode, means for coupling the plate of said second section of said double triode to the said tuned oscillating circuit, said coupling means comprising, in series, a plate capacitor connected to the plate of said second section of said double triode, a resistor, a coil inductively coupled to the said inductance of the said tuned oscillating circuit, said coil connected to ground, said plate capacitor and said resistor together constituting means for converting unidirectional tube noise impulses into altered impulses having longer time constants, said coupling coil providing means for filtering out said altered impulses, thereby providing means for producing relatively noise-free local oscillations; means for heterodyning the said relatively noise-free local oscillations with the wave signal, said means comprising capacitive coupling, said capacitive coupling supplied by the inherent capacity between the plates of said double triode, the plate-to-plate nature of said capacitive coupling and the low value of capacitance inherent in said capacitive coupling constituting means for the linear operation of the said first section of said double triode in addition to the above described means for said linear operation; and means for rectifying the heterodyned wave signal to produce a predetermined intermediate frequency, said means comprising a predominately unidirectionally conductive device the anode of which is connected to the plate of said first section of said double triode through a capacitor, said anode grounded through a resistor, the cathode of said predominately unidirectionally conductive device connected to an output terminal provided for connecting utilization means.

17. A relatively noiseless frequency converter for a superheterodyne wave-signal receiver comprising, in combination: a thermionic amplifier tube with associated input, output, and voltage control circuits with voltage and space current supply means, the components of said circuits having assigned values providing for the linear operation of said thermionic amplifier tube, therein means being constituted for the linear operation of said thermionic amplifier tube, the control grid of said thermionic amplifier tube having input means for receiving wave signals, the plate of said thermionic amplifier tube supplied with space current through a parallel plate feed resistor; means for generating noise-free oscillations comprising a thermionic oscillator tube, the grid of said thermionic oscillator tube connected to ground through a grid resistor, the plate supplied with space current through a parallel plate feed resistor, a tuned oscillating circuit comprising an inductance and variable capacitor in parallel, means for coupling said oscillating circuit to the grid of said thermionic oscillator tube, means for coupling the plate of said thermionic oscillator tube to the said tuned oscillator circuit, said coupling means comprising, in series, a plate capacitor connected to the plate of said thermionic oscillator tube, a resistor, a coil inductively coupled to the said inductance of said oscillating circuit, said coil connected in turn to ground, said plate capcitor and said resistor together constituting means for converting unidirectional tube noise impulses into altered impulses having longer time constants, said coupling coil providing means for filtering out said altered impulses, thereby providing means for producing relatively noise-free local oscillations; means for heterodyning the said relatively noise-free local oscillations with the wave signal supplied by a small capacitor connected between the plate of the aforesaid thermionic amplifier tube and the plate of the thermionic oscillator tube, the plate-to-plate nature of said capacitive coupling and the low value of capicitance required constituting means for the linear operation of the said thermionic amplifier tube in addition to the above described means for said linear operation; and means for rectifying the heterodyned wave signal to produce a predetermined intermediate frequency, a said means comprising a predominately unidirectionally conductive device connected in series with a capacitor between the plate of the aforesaid thermionic amplifier tube and an output terminal provided for connecting utilization means.

18. In a superheterodyne frequency converter having means for the linear amplification of the wave signal, means for loosely coupling the heterodyning local oscillations with the said wave signal, means for converting the heterodyned frequency into a corresponding intermediate frequency, and having means for the generation of said local oscillations, said means for generating said local oscillations comprising a thermionic oscillator tube, the grid of said thermionic oscillator tube connected to ground through a grid resistor, the plate supplied with space current through a parallel plate feed resistor, a tuned oscillating circuit comprising an inductance and a variable capacitor in parallel, means for coupling said tuned oscillating circuit to the grid of said thermionic oscillator tube, and a coupling coil for coupling the plate of said thermionic oscillator tube to the said tuned oscillating circuit; a capacitor and resistor in series are provided and inserted between the plate of said thermionic oscillator tube and said coupling coil, the said capacitor and said resistor having values to provide a time constant greatly in excess of the period of the wave signal, whereby the energy of short unidirectional tube noise impulses is converted into energy of impulses having longer time constants, causing these noise impulses to be filtered out of the system through the aforesaid coupling coil.

19. An automatic gain control system incorporated in a radio-wave receiver employing essentially linear operation of thermionic amplifier tubes in a radio amplifier cascade, in combination: means for the automatic control of the receiver gain in said radio-wave receiver, which means function concomitantly and in concordance with the linear operation of the thermionic amplifier tubes in said amplifier cascade, comprising means for varying the impedance of an interstage coupling unit in said radio amplifier cascade, which means comprise the plate-cathode circuit of a thermionc control tube of the pentode type connected through a capacitor in parallel with said radio interstage coupling unit, means for varying automatically the plate voltage applied to the plate of said thermionic control tube as the control grid voltage of said control tube is varied, said means consisting in a parallel plate feed resistor of relatively high resistance value through which space current is supplied to the plate of said thermionic control tube, by which means the plate-cathode impedance of said thermionic control tube may be varied over wide limits with relatively small variations in the control grid voltage of said thermionic control tube, convenient means for controlling operative voltages and circuit constants associated with said thermionic control tube, means for supplying control voltage for the control grid of said thermionic control tube provided by a power amplifier followed by a rectifier feeding into a filter, the output of said filter connected to the control grid of said thermionic control tube, and said power amplifier having an input coupled to the output of the above said radio amplifier cascade.

20. In an automatic gain control system incorporated in a radio-wave receiver employing essentially linear operation of thermionic amplifier tubes in a radio amplifier cascade, having means for the automatic control of the receiver gain in said radio wave receiver, which means function concomitantly and in concordance with the linear operation of the thermionic amplifier tubes in said amplifier cascade, comprising means for varying the impedance of an interstage coupling unit in said radio amplifier cascade, which means comprise the plate-cathode circuit of a thermionic control tube of the pentode type connected in parallel with said coupling unit, convenient means for controlling operative voltages and circuit constants associated with said thermionic control tube, means for supplying control voltage for the control grid of said thermionic control tube provided by a power amplifier with associated circuit means followed by a rectifier feeding into a filter, the output of said filter connected to the control grid of said thermionic control tube, said power amplifier having an input coupled to the output of the above said radio amplifier cascade; means are provided for varying automatically the plate voltage applied to the plate of the aforesaid thermionic control tube as the control grid voltage is varied, said means consisting in a parallel plate feed resistor of relatively high resistance value through which space current is supplied to the plate of said thermionic control tube, by which means the plate-cathode impedance of said thermionic control tube may be varied over wide limits with relatively small variations in the control grid voltage of said thermionic control tube.

References Cited in the file of this patent

UNITED STATES PATENTS

| | | |
|---|---|---|
| 1,935,738 | Craig | Nov. 21, 1933 |
| 1,985,696 | Seeley et al. | Dec. 25, 1934 |
| 1,993,860 | Roberts | Mar. 12, 1935 |
| 2,031,736 | Rocard | Feb. 25, 1936 |
| 2,153,760 | Kimball | Apr. 11, 1939 |
| 2,185,612 | Trevor | Jan. 2, 1940 |
| 2,315,173 | Wald | Mar. 30, 1943 |
| 2,354,141 | Purington | July 18, 1944 |
| 2,379,699 | Ford | July 3, 1945 |
| 2,383,888 | Price | Aug. 28, 1945 |
| 2,570,715 | Robinson | Oct. 9, 1951 |
| 2,608,649 | Magnuski | Aug. 26, 1952 |
| 2,623,947 | Roark | Dec. 30, 1952 |
| 2,629,817 | Cotsworth | Feb. 24, 1953 |
| 2,640,919 | Bell | June 2, 1953 |